United States Patent [19]

Siden

[11] 4,059,892
[45] Nov. 29, 1977

[54] DEFORMABLE WIRE STRIPPER

[75] Inventor: Dennis Siden, Portola Valley, Calif.

[73] Assignee: Raychem Corporation, Menlo Park, Calif.

[21] Appl. No.: 626,780

[22] Filed: Oct. 29, 1975

Related U.S. Application Data

[63] Continuation-in-part of Ser. No. 480,821, June 19, 1974, Pat. No. 3,931,672.

[51] Int. Cl.² ............................................. H02G 1/12
[52] U.S. Cl. ...................................................... 30/90.1
[58] Field of Search ................. 81/9.5 R, 9.51, 9.5 B; 30/346.53, 90.1, 345, 346, 350, 254; 83/648, 309; 29/427

[56] References Cited

U.S. PATENT DOCUMENTS

| 992,251 | 5/1911 | Reinfeld | 30/345 |
| 2,563,521 | 8/1951 | Ferriot | 30/345 |
| 2,768,276 | 10/1956 | Arntzen | 81/9.5 B |
| 3,469,488 | 9/1969 | Gaspari | 83/648 |
| 3,703,840 | 11/1972 | Kauf | 81/9.5 R |
| 3,735,763 | 5/1973 | Shannon | 30/254 |

FOREIGN PATENT DOCUMENTS

| 1,324,321 | 7/1973 | United Kingdom | 81/9.5 R |

Primary Examiner—James L. Jones, Jr.
Assistant Examiner—Roscoe V. Parker
Attorney, Agent, or Firm—Lyon & Lyon

[57] ABSTRACT

Disclosed is a deformable wire stripper comprising either a single or set of blades fabricated from a deformable material such as a plastic or soft metal. The blade material and its geometry are selected so that the blade will undergo plastic or elastic deformation upon contact with a metal conductor, but yet will penetrate and cause deformation of the wire insulation to be stripped.

19 Claims, 14 Drawing Figures

DEFORMABLE WIRE STRIPPER

CROSS-REFERENCE TO RELATED APPLICATION

This is a continuation-in-part of my copending application, Ser. No. 480,821, filed June 19, 1974, now U.S. Pat. No. 3,931,672, issued Jan. 13, 1976.

BACKGROUND OF THE INVENTION

Conventional wire strippers generally utilize extremely hard metal blades, such as hardened tool steel which typically have a hardness in the range of C50 to C70 on the Rockwell scale. Such blades are capable of cutting through both the plastic insulation and metal conductor. For this reason, in the fabrication of conventional wire strippers, the blades must be dimensioned to close tolerances so they will penetrate and cut the insulation, yet leave the conductor substantially untouched. To this end, the typical hand wire stripper comprises a cutting blade having therein a number of notches or grooves, each notch being dimensioned for use on a different size wire. Such a device requires the operator to properly select the correct notch size, and then carefully close the stripper around the wire so as to cut and penetrate the insulation without damage to the wire. Damage to the conductor is prevalent with such strippers, since such stripping techniques not only require the operator to carefully select the proper notch, but also requires that close tolerances be maintained in the fabrication of the blades as well as the wires. Where either the wire or the blade notch is out of tolerance, poor stripping or damage to the conductor may result. Inadequate penetration of the insulation may cause an incomplete strip of the insulation, or tearing of the insulation resulting in a non-uniform and ragged edge. Penetration of the blade to a depth of greater than the insulation may result in the cutting, gouging or deformation of the conductor, the damaged area being a prime spot for electrical, mechanical or corrosive types of failure.

U.S. Pat. No. 3,703,840 in attempting to obviate the requirement of exact dimensioning of the blade to conform about the wire, provides a plurality of thin blade-like members mounted on spring arms so that they may flex, and move relative to each other when closed about a wire. The spring means is so tensioned that the blade members will cut and sever the electrical insulation but will flex upon contact with the metal conductor. However, it is specifically noted that the cutter blade must be made of a metal and preferably of relatively hard steel. It was previously thought that materials softer than that of a copper conductor which has a typical hardness in the range of B10 to B75 on a Rockwell scale would have marginal penetration into the insulation making it either impossible to strip such insulation or resulting in an extremely ragged edge at the end of the stripped insulation. In addition, it was heretofore accepted that extremely hard cutting steel or a like material was required to insure a reasonable working life.

It is an object of this invention to provide a wire stripper having blades which will strip insulation yet not damage the conductor even if placed in pressure contact therewith. It is another object of this invention to provide such a deformable blade from a single material, without the requirements of springs or flexing configurations.

SUMMARY OF THE INVENTION

These and other objects are accomplished by selecting a geometry and blade material which, upon application of sufficient force, will penetrate the insulation, deforming and/or cutting it, and upon pressure contact with the conductor, will itself deform rather than deforming or penetrating the conductor.

More particularly, a material having a Rockwell hardness between M40 to M115 and L1 to L115 which undergoes plastic or elastic deformation is configured to form a cutting edge. The blade material is operably connected to a force exerting means such that upon application of sufficient force, the edge will cut or deform the insulation, after which the insulation can be stripped from the conductor.

BRIEF DESCRIPTION OF THE DRAWINGS

FIG. 7 is a cross-section of a coaxial cable while

PREFERRED EMBODIMENT

This invention is related to an apparatus and process of stripping wires. By use of the term "wire" is meant not only conventional, concentric insulated conductors, for which prior art conventional wire strippers are generally designed, but also, other "wire" configurations for which the present invention is particularly suited. Thus, by the term "wire" is meant, any jacketed conduit in which the conduit is less deformable than the jacket. The term "conductor" as used herein is synonomous with conduit and includes not only electrical conductors, but also optical conductors wherein easily damaged fiber optics materials such as the acrylics may be stripped via this invention. In addition, "conductor" may include conduits or pipes for the transmission of liquid or gaseous material, such conduits having an outer jacket, as for example where thermal insulation of the conduit is required. Finally, by the term "wire" is meant not only concentrically positioned conductors and insulation, but also a variety of other conductor-insulation configurations. For example, flat cables, ribbon cables as well as a plurality of insulated conductors having an outer secondary insulating jacket around and therebetween.

Figure 1:
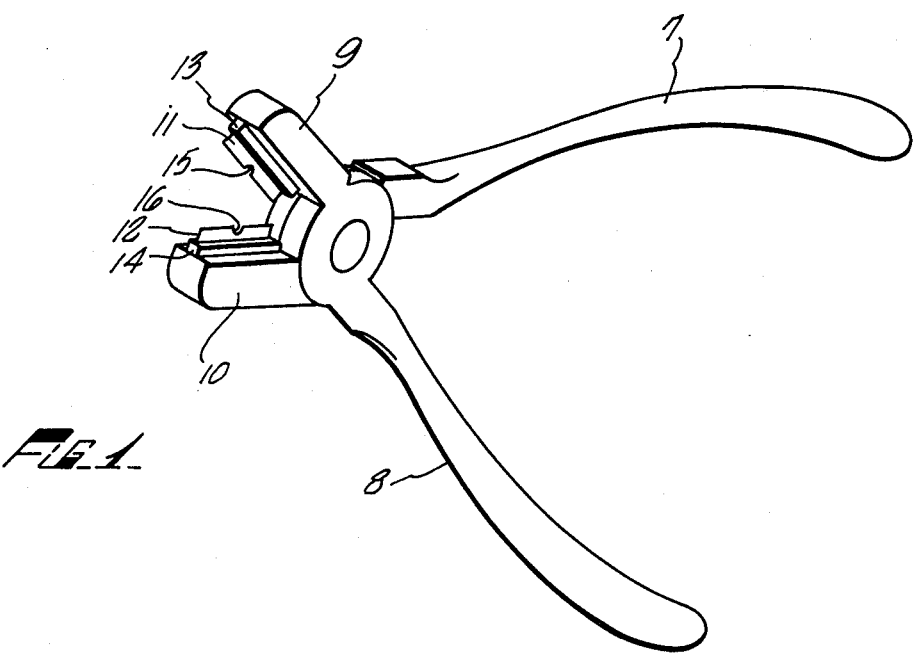
FIG. 1 is a perspective illustration of a wire stripping device according to one embodiment of this invention.

Referring to FIG. 1, a hand wire stripper utilizing the deformable blade of this invention is shown. Handles 7 and 8 are connected to jaws 9 and 10 through which is applied pressure contact to deformable blades 11 and 12. The blades are conveniently mounted in mounting blocks 13 and 14 for easy replacement. Notches 15 and 16 may be pre-formed or may result from the stripping operation itself as will be discussed in greater detail later. Of course, it will be understood that although a simple hand held wire stripper is illustrated, a wide variety of wire stripping designs can be utilized in accordance with this invention, including automatic wire strippers. Also, for round cross section wire notches 15 and 16 will be semicircular, but it should be understood that numerous other shaped notches are envisioned, depending upon the particular application.

Figure 2:
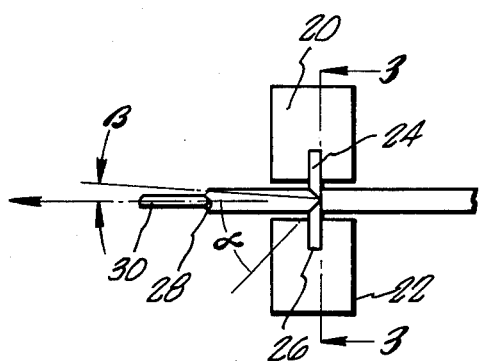
FIG. 2 is an illustration of the use of two deformable blades in the stripping of wire insulation.
Figure 3:
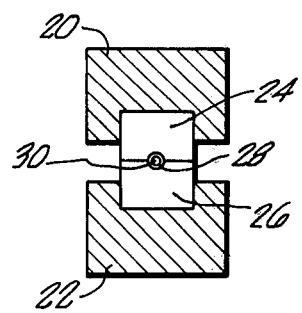
FIG. 3 is a cross-section taken along line 3—3 of FIG. 2.

Referring to FIGS. 2 and 3, a wire stripper having two deformable blades, 24 and 26 are utilized for stripping of the insulation. The blades are set and aligned in tooling blocks 20 and 22 by any convenient means, such as a set screw, not shown. Blades 22 and 24 taper to an edge of less than 0.030 inch and is preferably about 0.005 inch to about 0.001 inch. The angle of taper, $\alpha$ is preferably less than 65° and in most instances preferably between 15° and 45°. Greater angles tapering to an edge of approximately 0.001 inch have a tendency to bend away upon pulling of the wire, resulting in poor or no stripping of the insulation. Ideally, the angle of pull, $\beta$, should be 0°, but variation in pull angle up to 30° appear to have little effect on stripping. Also, shown in FIG. 2, the direction of pull away from the blade taper is preferred, yet good strips have been obtained by pulling in the opposite direction.

Referring more specifically to FIG. 3, blades 24 and 26 are shown in the closed position deformed about the conductor. The degree of deformation of the blade, and its degree of penetration into, and deformation of, the insulation, will of course vary with the blade, i.e., with the blade geometry and the relative hardness of the material used for its fabrication, and insulation materials. In accordance with this invention, a "strain balance" must be achieved between the blade, the insulation, and the conductor. The blade should be selected so that it will readily penetrate and deform the insulation, with little or no deformation of its own, but upon total penetration of the insulator and pressure contact with the conductor, it will deform as opposed to damaging the conductor. For relatively soft insulation, such as polyethylene, with a relatively hard deformable blade such as plexiglass, a 0.005 inch edge has been found to readily penetrate and cut the insulation, and then deform about the conductor. Upon stripping, smooth, uniform edges result. Where harder insulators, as for example where polyvinylidene fluoride type insulations are to be stripped, and a softer blade material, such as nylon 6/6 is used, the blade need not completely cut and penetrate the insulation, but need merely deform it to such an extent that upon pulling of the insulation, a relatively smooth break in insulation is obtained. Surprisingly, I have found that as long as substantial deformation of the insulation is obtained, and the angle of pull is substantially along the axis of the wire, complete cutting of the insulation is not necessary to achieve a uniform edge.

Of course, in accordance with this invention, the proper "strain balance" must be maintained. Thus, for instance relatively soft blade materials, such as 6/6 nylon or acrylonitrile-butadiene-styrene polymer (ABS) may not be suitable for the stripping of extremely hard varnish insulations, since the blade will substantially deform prior to deformation and penetration into the insulation. By proper "strain balance" is meant that through the stripping operation, the conductor undergoes substantially no strain while the insulation undergoes substantial strain from the applied stress of the blade, and the blade itself undergoes, at most, slight deformation while deforming the insulation but readily deforms upon contact with the conductor. In the case of extremely hard insulations, such as varnishes it may be necessary to utilize plastic materials having inorganic fillers to act as abrasives and reinforcing agents thereby increasing the toughness of the blade to prevent its deformation during penetration of the insulation. However, greater care must be taken in this case to insure that the conductor is not deformed by the blade material. Where extremely hard, deformable blades must be utilized due to the toughness of the insulation, notches or grooves are preferably pre-cut in the blades as is done with conventional metal wire strippers. However, even here, close tolerances and proper groove selection is not nearly as critical as with sharp metal blades, since even reinforced plastic materials such as glass filled epoxies, tend to deform before actually cutting into and permanently damaging a metal conductor. Prenotching also is beneficial in reducing the penetration force required, thereby in the case of hand strippers, reducing operator fatigue. Nevertheless, in using relatively hard materials such as epoxy-glass, pre-grooving the blades is advisable so that the blades need not be required to undergo complete deformation around the entire conductor diameter increasing the possibility of damage to the conductor. On the other hand, where relatively soft wiring insulations, such as polyolefins or polyvinyl chloride (P.V.C.) are to be stripped, relatively soft blades such as nylon 6/6 or ABS may be used. Such blades, need not have a notch or groove pre-cut therein since upon contact with the conductor, they will readily deform around the counductor with no resulting damage to the conductor. Surprisingly, and completely contrary to any suggestions of the prior art, I have found that deformable blades, such as nylon may be utilized over extended periods for the stripping of wire, i.e., greater than 100 strips. Also, unexpectedly, the edge of the insulation stripped is in many cases, as smooth and as uniform as wire stripped with the proper sized metal cutting blade.

In addition, since for most applications, the blades need not be pre-notched or grooved to a specific wire size, odd shaped wires such as non-concentric wire may also be readily stripped via this process. Also, multiple wires, even of different diameters, may be stripped in a single stripping operation. For example, using the stripping device of this invention it is possible to simultaneously strip each member of twisted pairs, wherein the wires are not only stripped but also straightened via one pulling operation eliminating the necessity of straightening the wires and then stripping them in separate operations.

Also, wires having stranded conductors have been stripped without any discernable damage to the conductor. For example, polyarylene blades, (Stylan$^T$, a polyaryl ketone from Raychem Corp.) not pre-notched, were found suitable for stripping stranded wire with P.V.C. insulations of A.W.G. sizes between 16 and 30.

Figure 4:
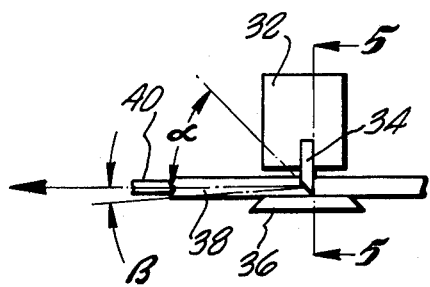
FIG. 4 is an illustration of the use of a single blade and anvil in the stripping of wire insulation.
Figure 5:
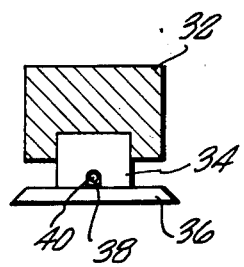
FIG. 5 is a cross-section taken along line 5—5 of FIG. 4.

Referring to FIGS. 4 and 5, an alternative embodiment of this invention is shown. A single blade, either pre-notched, or readily deformable about the conductor, may be utilized in conjunction with an anvil. Deformable blade, 34, is aligned with the wire, and set into block 32 by any convenient means. The angle of taper, $\alpha$, is preferably less than 60°, while the angle of pull, $\beta$, is ideally 0°. The anvil, 36, should be made of a flat material, so upon exertion of pressure, as best seen in FIG. 5, the blade 34, will penetrate the insulation 38, and deform about the conductor, 40, stopping upon contact with the anvil.

Figure 6:
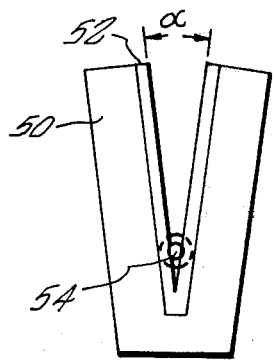
FIG. 6 is an illustration of the use of a single V-shaped blade for the stripping of wire insulation.

Referring to FIG. 6, another configuration of a wire stripper according to this invention is depicted having but a single part. In this embodiment a V-shaped blade 50, having a tapered edge 52 of preferably less than 60° and an angle, $\alpha$, of approximately 15° is utilized to effectively present two surfaces to a substrate. The wire to be stripped 54, is wedged into the apex of the V so that the blade penetrates the insulation. The angle of pull of the wire should be in a slightly downward direction to maintain the wire tightly in the blade. It should be apparent that such a configuration permits the use of a single inexpensive part for the stripping of a widerange of wire diameters, since the smaller the wire the further down into the V the wire will be wedged.

Figure 7:
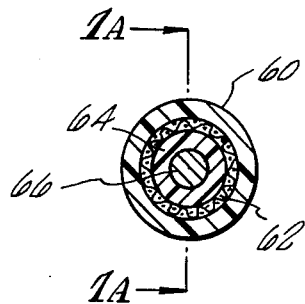
Figure 7A:
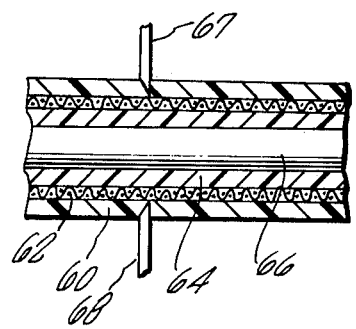
FIG. 7a is a view taken along line 7a of FIG. 7 illustrating the use of the blade of this invention for stripping the outer insulating jacket of the cable.

FIGS. 7 and 7a depict the use of a set of blades in accordance with this invention for the stripping of coaxial cables. A typical coaxial cable has an outer insulating material 64 which may be a relatively soft foam and an inner conductor 66. Outer conductive braid 62, is often made of very thin crisscrossing wires. For the stripping of only the outer conductor of such cables, great care must be taken with conventional wire strippers to insure that the blade does not contact the thin wire braid, since it may easily be broken or damaged. By the use of the deformable blades of this invention, 67 and 68, the tolerance of the blades are not as critical. Blades 67 and 68 should be so configured so as to substantially penetrate but not completely cut through the outer insulation, so that upon pulling of the wire, only the outer insulation is removed without damage to the braid.

Figure 8:
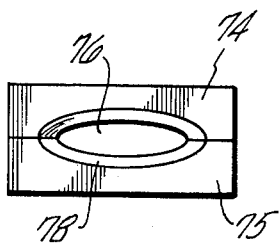
FIGS. 8 and 8a depict a set of blades forming an eliptical groove and its use for the stripping of twisted pairs of cables.
Figure 8A:
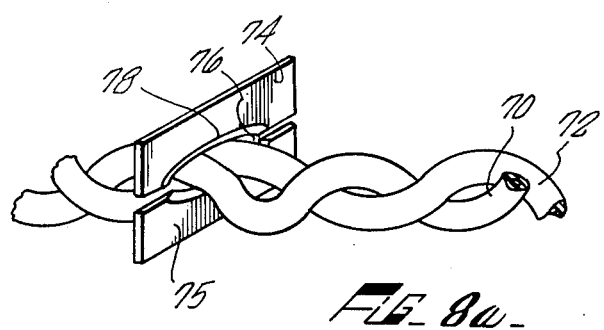

Turning to FIGS. 8 and 8a, I have found an elliptical blade geometry particularly suitable for the stripping of twisted pairs. Blades 74 and 75, when positioned around the cables to be stripped, form a generally elliptical opening 76. The taper of the blade, 78 is preferably less than 60°. Twisted pairs 70 and 72 upon closing of the blades thereabound and pulling of the wires, are not only stripped without damage to the conductor, but are also straightened. With conventional wire strippers, it is often necessary to first untwist and hand straighten the twisted pairs, and then strip each wire individually. By utilizing the elliptical geometry and the blades in this invention, twisted pairs may be made ready for connection in a single stripping operation.

Figure 9:
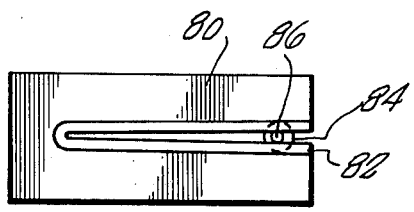
FIG. 9 illustrates the use of a single blade and slot configuration for the stripping of insulation.

FIG. 9 is another single part embodiment of this invention in which a slotted blade 80 having slot 84 is utilized. The width of the slot is less than the insulation 82 and approximately equal to the diameter of conductor 86. By sliding the conductor into the slot, cutting action is achieved. Since the blade is softer than the conductor, any contact with the conductor will not cause cutting or nicking. The substantially cut insulation is then removed by pulling the wire in a direction substantially along the longitudinally axis of the wire.

Figure 10:
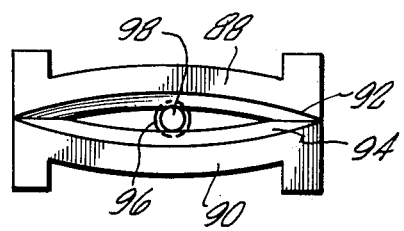
FIG. 10 illustrates the use of two flexible blades for stripping insulation.

FIG. 10 depits an unnotched flexible set of blades. As previously discussed, the blades of this invention should be of such a material and geometry so as to achieve a "strain balance" between the blade, the insulation and the conductor. Generally, such a strain balance may be achieved by selecting a combination of blade geometry and blade material which will allow the blade to readily penetrate and deform the insulation, but upon total penetration of the insulator and upon pressure contact with the conductor, the blade will deform as opposed to damaging the conductor. The deformation upon contact with the conductor may be either by compresion of the blade, or may be flexing of the blade about the conductor as shown in FIG. 10. In many instances, with respect to the use of soft, flexible materials, a combination of compression and flexing will occur. FIG. 10 depicts a set of flexible blades 89 and 90 tapered at less than 60°, at 92 and 94, substantially penetrating the insulation 96 but flexing by bowing from their original straight and parallel arrangement, so that any damage to the conductor 98 is avoided. By pulling the wire substantially along the longitudinal axis of the wire, stripping of the insulation is accomplished.

Figure 11:
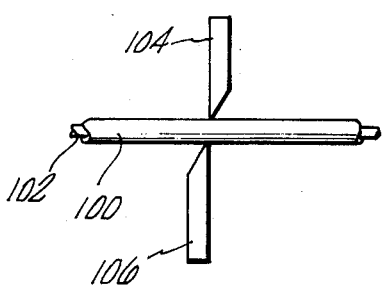
FIGS. 11 and 11a illustrate the use of two offset blades for stripping the wire via a peeling action.
Figure 11A:
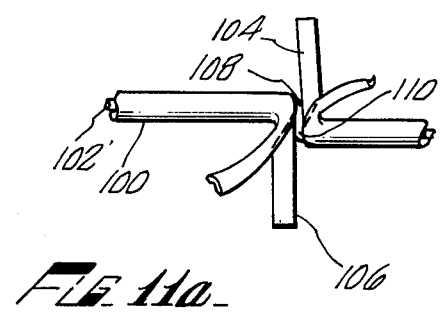

Turning to FIGS. 11 and 11a, a process of stripping wire via this invention is illustrated in which the wire need not be pulled. By offsetting the pair of blades, 104 and 106 and moving them past each other, the insulation of the wire 100 may be peeled away for a specific distance, as for example from 108 to 110. Such a peeling type configuration would not be suitable for use with conventional blades, since the conventional blade upon contact with the conductor 102, would readily slice into and peel the conductor as well. On the other hand, deformable blades 104 and 106 having a relatively sharp edge, will penetrate and peel the insulation, but will ride along the inner conductor without any damage whatsover.

It will of course be understood that numerous other blade configurations utilizing deformable blades may be designed for use in accordance with this invention.

A wide variety of suitable polymers may be employed in the stripping device of this invention so long as they are suitably tough and non-brittle. Among the suitable polymers are acrylic polymers including polymers of acrylonitrile, acrylic and methacrylic acids and their esters (for example, ethyl acrylate, methyl methacrylate and the like), polyamides such as nylon 6/6, epoxy resins, polycarbonates, formaldehyde polymers (acetal), polystyrene, acrylonitrile-butadiene-styrene copolymer and aromatic polymers such as polyphenylene oxide, polyaryl sufones, polyaryl ketones and the like. Suitable soft inorganic materials, particularly solder materials, can also be advantageously employed in the invention.

Although surprisingly, we have found that relatively soft deformable blades exhibit good stripping properties for a number of strips, it will be understood that for optimum reliability the blades may be used on a "one shot" basis. Since the cost of the blade material may be kept relatively inexpensive, i.e. polystyrene, and little or no machining is required, by achieving the proper "strain balance" between the insulation, conductor and blade, an excellent cut, with no damage to the insulation may be achieved by utilizing a fresh blade for each strip. Obviously, as even in the case with pre-notched metal blades, the quality of the strip will deteriorate over extended use of the same blade. However, unlike pre-notched steel blades, the use of a fresh blade after each strip is not economically prohibitory. Where high quality electrical terminations are required, the cost of constant replacement of a plastic deformable blade is minimal. Also, to achieve such continuous replacement of the blade, it would be understood that a means may be provided in the wire stripper device for storing a number of blades and automatically unloading the used one and loading a fresh one after each strip.

Finally, in some applications it may be desired to allow the blade to remain over the stripped conductor. For example, when a solder is used as the blade material, it may be left in place and heated later to form a solder joint. This method is enhanced by devising the blade so that when it is deformed upon contact with the conductor a permanent deformation or set is achieved.

This invention will become apparent from the following more specific examples.

EXAMPLE I

Irradiated P.V.C. insulated wire (Raychem Rayovin ® 21/011-22) was stripped using a nylon 6/6 blade. Blades with variation in taper to an edge of 0.001 inch were evaluated, the results of which are summarized in Table I. The taper was measured as shown by the angle $\alpha$ in FIG. 2

Table I

| (°) | Stripping Force (lb.) | Remarks |
| --- | --- | --- |
| 15° | 7.0 | always stripped |
| 30° | 7.0 | always stripped |
| 45° | 6.0 | stripped 50% of time |
| 50° | 4.0 | no strip |
| 60° | 2.0 | no strip |
| 75° | .2 | no strip |

From the table, it can be seen that variations in blade geometry may produce variations in stripping results. This is due to the amount of penetration force that the blade can exert on the wire insulation as well as the amount of shear stress it can withstand upon pulling. If the penetration force is high enough, plastic deformation of the insulation will occur and stripping will result unless the shear strength of the blade is exceeded by the stripping force required by the particular insulation being stripped. On the other hand, if the angle is too great, the blade material will either deform at too low a stress level during penetration of the plastic or because of its low cross-section at the point of penetration, will be sheared off during pulling of the wire.

EXAMPLE II

This example demonstrates the importance of blade material on stripping results. A P.V.C. insulated wire, as in Example I (Raychem Rayovin ® #21/011-21) was stripped using various blade materials tapered at a 45° angle to an edge of 0.005 inch. The results are summarized in Table II. $F_s$ represents the force required to strip when penetration of the insertion has occurred while $F_p$ represents the force required to deform a pair of blades around the wire so that they meet. It will be appreciated that this deformation may occur with or without penetration of the insulation. The latter occurs when the force required for penetrating the insulation exceeds the force required to deform the blades.

Table II

| Blade Material | $F_s$(lb.) | $F_p$ | Remarks |
| --- | --- | --- | --- |
| ABS | 3.5 | 4.7 | no strip |
| Polystyrene | 2.3 | 12.3 | stripped |
| Expoxy-Glass (G-10) | 3.0 | 13.0 | stripped |
| Acrylic Plexiglass | 4.8 | 12.0 | stripped |
| Nylon 6/6 | 4.1 | 6.8 | stripped inconsistently |
| Polycarbonate | 2.6 | 8.8 | stripped |

Table II-continued

| Blade Material | $F_s$(lb.) | $F_p$ | Remarks |
| --- | --- | --- | --- |
| Polyarylketone (Stylan T from Raychem Corp.) | 5.7 | 8.7 | stripped |

As can be seen from Table II, for the specific blade geometry chosen the force required to penetrate the P.v.C. insulation was greater than 8 lbs. Where softer blade materials were used, which deformed at less than 8 lbs., poor stripping resulted. Harder materials, which did not deform at the force required to penetrate the insulation, such as plexiglass and polystyrene, gave excellent stripping results. Although the most suitable blade material may vary from insulation to insulation, deformable materials ranging in hardness between a Rockwell hardness of M30 to 115 to L1 to L115 when tested via ASTM Test Method D785 are best suited for use as deformable blades. For convenience, this range has been defined as M30 to 115. Although inexpensive thermoplastic materials which will undergo plastic deformation upon contact with the conductor are preferred and adequate for most applications, tougher, thermosetting materials such as epoxy-glass, are also contemplated by this invention for hard to strip insulators. Also, elastomeric materials which undergo elastic deformation during stripping but recover to the original shape after stripping may be utilized, provided that the elastomer is substantially less deformable than the insulation to be stripped.

EXAMPLE III

Example III demonstrates the dependence of the performance of deformable strippers on the type of wire insulation. A blade material of nylon 6/6 tapered at a 45° angle to a sharpness of 0.005 inch was evaluated with various insulators over 22 A.W.G. stranded wire. The results are summarized in Table III.

Table III

| Wire | $F_s$(lb.) | Remarks |
| --- | --- | --- |
| Irradiated P.V.C. (Rayovin #21/011-22 Raychem Corp.) | 3.9 | stripped inconsistently |
| Thermorad$^R$ (irradiated polyethylene, Raychem Corp.) | 4.5 | stripped |
| Non-irradiated P.V.C. | 4.1 | stripped |
| Polyethylene telephone wire from Western Electric) | 4.2 | stripped |
| Spec 44 (Polyvinylidene fluoride polyethylene wire) | 9.1 | no strip |

From Table III, it can be seen that, in the blade geometry chosen, a relatively soft, inexpensive thermoplastic blade material, such as nylon 6/6 may be used to strip common insulators such as P.V.C. and polyethylene. On the other hand, in this geometry such a blade material is not suited for the stripping of extremely tough insulators such as polyvinylidene fluoride jacketed polyethylene. However, other deformable blade materials in this geometry were used with success in stripping of this insulation, as for example G 10 epoxy-glass.

EXAMPLE IV

The V-shaped configuration as generally depicted in FIG. 6 was tested with various wire sizes and insulators as shown in Table IV. The throat angle, $\alpha$ was 5°, while the edge angle was 45° and the blade material was Stylan, as described in Example II.

Table IV

| Wire Size/Type | Stripping Force/lbs. | Comments |
|---|---|---|
| Spec. 44/24 AWG (Polyvinylidene fluoride polyethylene wire) | 5.7 lbs. | stripped |
| Rayovin/20 AWG (21/700-20-8, Raychem Corp.) | 6.1 lbs. | stripped |
| PVC stranded/ 26 AWG (Standard hook-up wire) | 3.2 lbs. | stripped |
| Polyethylene/ 26 AWG (Telecommunications solid conductor) | 3.1 lbs. | stripped |

The tests indicated that the one V-shaped configuration was suitable for the stripping of a wide range of insulators and wire sizes.

EXAMPLE V

Tin-lead solder was tested as a blade material. A straight blade configuration similar to the geometry of Example I was utilized and the results are summarized in Table V.

Table V

| Sample | Penetration Force (lbs) | Hardness (Rockwell) | Stripping Force (lbs.) | Wire Size/ Type | Comments |
|---|---|---|---|---|---|
| Sn63/ Pb 37 | 17.0 | M35 | 6.0 | Irr.PVC/22 AWG | no strip |
| Sn96.5/ Pb 3.5 | 27.0 | M107 | 11.0 | Irr.PVC/22 AWG | strip |
| Sn63 | 18.0 | M35 | 6.0 | Spec.44/22 AWG | no strip |
| Sn96.5 | 29.0 | M107 | 11.0 | Spec.44/22 AWG | strip |

As can be seen from Table V, the harder Sn 96.5 material stripped the insulation while the softer material was found unsuitable for stripping these particular insulators tested.

The use of solder as a blade material affords some distinct advantages. Where the stripped wire is to be connected via a solder joint, any blade residue remaining after stripping will be compatible with solder. This may avoid a cleaning operation. Also, the solder blade may be purposefully left on the stripped conductor to effect a solder joint.

I claim:

1. A tool for stripping insulation from an insulated conductor which comprises in combination a deformable blade means having a Rockwell hardness between M30 and L115, said blade mean including a tapered edge and being comprised of a material exhibiting a deformation less than the deformation of the insulation and greater than that of the conductor and means for exerting a force on said insulated conductor opposite the point at which said deformable blade means engages the insulated conductor to urge said insulated conductor into engagement with said deformable blade means so that said deformable blade means cuts through said insulation and deforms upon contact with said conductor.

2. The tool of claim 1 wherein the blade means tapers to an edge of less than 0.030 inch, the angle of taper being less than 60° measured from the axis of the wire positioned for stripping.

3. The tool of claim 1 wherein the blade means is a plastic selected from the group consisting of acrylic polymers, acrylonitriile-butadiene-styrene, epoxy resins, polycarbonates, nylon, acetal, polyarylketones, polyphenylene oxide, polysulfones, and polystyrene.

4. The tool of claim 1 wherein the blade means is a plastic containing an inorganic filler.

5. The tool of claim 1 wherein the blade means is a solder material.

6. The tool of claim 5 wherein the blade means is a tin-lead solder material.

7. The tool of claim 1 wherein the blade means is pre-shaped to the approximate size and configuration of the conductor.

8. The tool of claim 1 wherein the blade means is in a V-shaped configuration into which the wire to be stripped may be wedged.

9. The tool of claim 1 wherein the blade means has a slot into which the wire to be stripped may be placed said slot having a diameter less than the diameter of the insulation and approximately equal to the diameter of the conductor.

10. A tool according to claim 1 wherein the force exerting means is a second deformable blade.

11. The tool according to claim 1 wherein the blade means tapers to an edge of less than 0.030 inch, the angle of taper being between 15° and 45° measured from the axis of the wire positioned for stripping.

12. A tool according to claim 2 wherein the force exerting means is a second deformable blade.

13. A wire stripper comprising a deformable stripping means having a Rockwell hardness between M30 and L115 in combination with a force exerting means, said stripping means comprises at least one blade tapering to an edge and being selected from a material having a deformation less than the deformation of the insulation on an insulated conductor to be stripped but greater than the deformation on the conductor, said force exerting means being capable of exerting sufficient force on said stripping means to cause it to deform the insulation and to cause said stripping means to deform upon contact with the conductor.

14. The tool according to claim 13 wherein the blade means tapers to an edge of less than 0.030 inch, the angle of taper between 15° and 45° measured from the axis of the wire positioned for stripping.

15. The wire stripper of claim 13 wherein the force exerting means in an anvil.

16. The wire stripper of claim 13 wherein the stripping means and force exerting means forms a substantially eliptically shaped opening around the wires to be stripped, said stripping means and force exerting means being particularly suited for the stripping of a plurality of wires.

17. The wire stripper of claim 13 wherein the stripping means and force exerting means comprises a pair of blades offset from each other such that upon movement in one direction, the blades are caused to move past each other, sandwiching between said moving blades the wire to be stripped and peeling away the insulation of the sandwiched wire.

18. The wire stripper of claim 13 wherein the deformable stripping means and force exerting means comprises a plurality of deformable blades.

19. The wire stripper of claim 13 wherein the deformable blade tapers to an edge of less than 0.030 inch, the angle being less than 60° measured from the axis of the wire positioned for stripping.

* * * * *